US012717730B2

(12) United States Patent
Wallichs et al.

(10) Patent No.: US 12,717,730 B2
(45) Date of Patent: Aug. 25, 2026

(54) MULTIPLE CHANNEL DIRECT ACCESS MEMORY-BASED CONFIGURATION SYSTEM

(71) Applicant: Altera Corporation, San Jose, CA (US)

(72) Inventors: Gary Brian Wallichs, San Jose, CA (US); Andrew Martyn Draper, Chesham (GB); Kye Howe Wong, Gelugor (MY); Kalen Brunham, Toronto (CA); Jeffrey Edward Erikson, Dripping Springs, TX (US)

(73) Assignee: Altera Corporation, San Jose, CA (US)

( * ) Notice: Subject to any disclaimer, the term of this patent is extended or adjusted under 35 U.S.C. 154(b) by 3 days.

(21) Appl. No.: 17/856,632

(22) Filed: Jul. 1, 2022

(65) Prior Publication Data

US 2024/0004810 A1 Jan. 4, 2024

(51) Int. Cl.

*G06F 13/16* (2006.01)
*G06F 13/28* (2006.01)
*G06F 13/40* (2006.01)
*G06F 15/167* (2006.01)

(52) U.S. Cl.

CPC .......... *G06F 13/1673* (2013.01); *G06F 13/28* (2013.01); *G06F 13/4072* (2013.01); *G06F 15/167* (2013.01)

(58) Field of Classification Search

None

See application file for complete search history.

(56) References Cited

U.S. PATENT DOCUMENTS

| | | | | |
|---|---|---|---|---|
| 6,222,757 | B1 * | 4/2001 | Rau | H03K 19/1776 365/189.12 |
| 10,402,223 | B1 * | 9/2019 | Santan | G06F 9/4881 |
| 10,833,679 | B2 | 11/2020 | Clark et al. | |
| 2016/0049941 | A1 | 2/2016 | How et al. | |
| 2018/0181757 | A1 * | 6/2018 | Pappu | G06F 13/4282 |

OTHER PUBLICATIONS

AMD XILINX, "Versal ACAP Design Guide (UG1273)," Apr. 27, 2022, accessed via https://docs.xilinx.com/r/2022.1-English/ug1273-versal-acap-design/Overview, pp. 1-90.

AMD XILINX, "Versal ACAP CPM DMA and Bridge Mode for PCI Express v2.1," Product Guide, Vivado Design Suite, PG347 (v2.1), May 4, 2021, accessed via https://docs.xilinx.com/v/u/2.1-English/pg347-cpm-dma-bridge, pp. 1-238.

* cited by examiner

*Primary Examiner* — Baboucarr Faal

(74) *Attorney, Agent, or Firm* — Fletcher Yoder, P.C.

(57) ABSTRACT

A system including a host device and an integrated circuit. The host device includes a host memory, the host memory storing configuration data. The integrated circuit device includes an integrated circuit and a direct memory access circuitry. The direct memory access circuitry pulls the configuration data from the host memory. The direct memory access circuitry also programs the integrated circuit based on the configuration data.

21 Claims, 8 Drawing Sheets

72
HOST
46
74
12, 70
SECTORS
50, 76
82
50
84
86
80
POWER SUPPLY
78

MULTIPLE CHANNEL DIRECT ACCESS MEMORY-BASED CONFIGURATION SYSTEM

BACKGROUND

The present disclosure relates generally to reading and writing configuration data. More particularly, the present disclosure relates to using a direct memory access (DMA) architecture.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits, such as field programmable gate arrays (FPGAs) are programmed to perform one or more particular functions. In particular, FPGAs are programmed using configuration data to facilitate performing the one or more functions. Often, the configuration data is provided to the FPGA from a server computer processing unit (CPU) (e.g., server CPU) attached to the FPGA and over a particular communication protocol (e.g., peripheral component interconnect express (PCIe)). The server CPU may push the configuration data to the FPGA using a memory mapped input output (MMIO) architecture. Specifically, the MMIO architecture may involve multiple data paths for the configuration data packets arriving at the FPGA to be mapped to internal configuration management hardware of the FPGA. However, the internal data paths may require complex and custom firmware orchestration for the FPGA to be configured as expected, for example, within a predetermined time, as well as require custom firmware for managing communication between drivers of the server CPU and hardware of the FPGA. Moreover, the configuration data is often partitioned into blocks of data (e.g., data packets), such as 4 bytes, and communicating 4 bytes at a time for an entire FPGA image may be time consuming.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
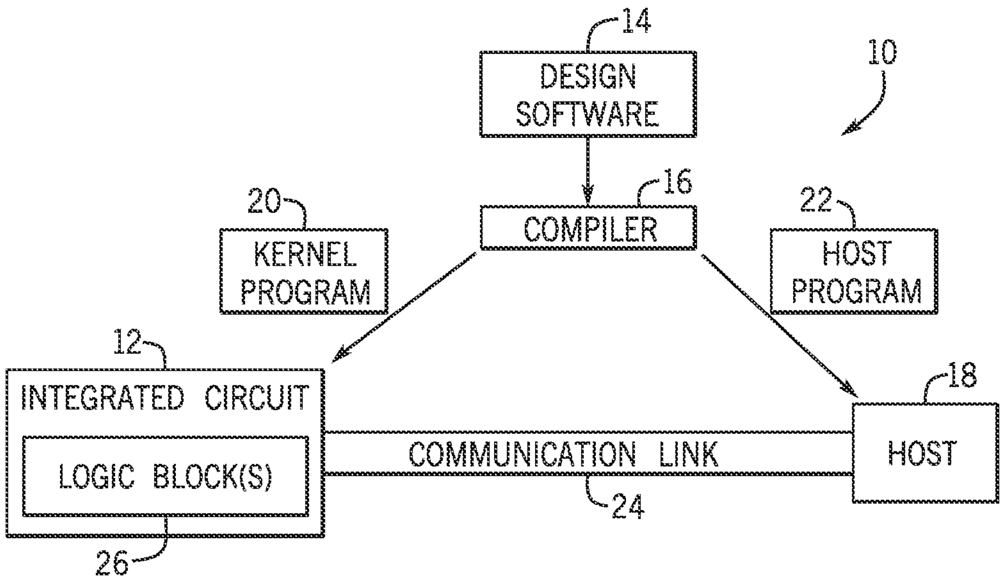
FIG. 1 is a block diagram of a system used to program an integrated circuit device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present systems and techniques relate to embodiments for reducing software development complexities associated with configuring and/or reconfiguring an integrated circuit indirectly. For example, integrated circuits, such as field programmable gate arrays (FPGAs) are often configured using configuration data that is provided to the FPGA from a host computer processing unit (CPU) (e.g., server CPU) attached to the FPGA and over a particular communication protocol (e.g., peripheral component interconnect express (PCIe)). The host CPU may push the configuration data to the FPGA using a memory mapped input output (MMIO) architecture.

Specifically, a direct memory access (DMA) engine and a host driver of the host CPU may program the DMA engine and the DMA engine may perform offloading. That is, the host CPU may program pointers in a MMIO architecture for memory to be stored or a location to fetch data, and the DMA engine PCIe end point may pull data into the FPGA and process the data. The MMIO architecture may involve multiple data paths for the configuration data packets arriving at the FPGA to be mapped to internal configuration management hardware of the FPGA. However, the internal data paths may require complex and custom firmware orchestration for the FPGA to be configured as expected, for example, within a predetermined time, as well as require custom firmware for managing communication between drivers of the host CPU and hardware of the FPGA. Moreover, the configuration data is often partitioned into blocks of data (e.g., data packets), such as 4 bytes, and communicating 4 bytes at a time for an entire FPGA image may be time consuming. Furthermore, in some instances, the host CPU may be also be involved in pushing data itself for each byte of transfer data into FPGA. As such, operations performed by the CPU may be limited to pushing configuration data to the FPGA such that the host CPU may be unavailable to perform other CPU-related functions in a system.

The memory mapped input output (MMIO) techniques described herein may include a DMA engine in the device for the FPGA. The DMA engine may be a hardened component of the device. The DMA engine may fetch blocks of configuration data directly from a host memory and push it into a configuration security processing agent for processing. As such, the techniques may offload CPU-based operations (e.g., and PCIe based) using a DMA-based solution. The DMA engine may fetch larger blocks of data than the host CPU (e.g., 6 bytes at a time rather than 4 bytes. The DMA engine is more directly in control of how much data is read and/or written, providing a more efficient means how data may be read from a configuration bitstream in host memory. That is, rather than a host CPU push model, the techniques described herein use a device centric DMA pull model. The DMA engine may pull from buffers to program the FPGA which makes FPGA programming faster into FPGA, as well as makes the CPU free and available to perform other operations.

As such, directly reading and/or writing configuration data without communicating with the host CPU prior to reading and/or writing configuration data, may reduce a time duration otherwise associated with communication with the host device over multiple data paths to ultimately configure the FPGA. Moreover, using multiple direct channels for communication between a controller of the host CPU and a local controller of the FPGA may facilitate reduced time for communication between the controllers, as well as the synchronization of the data between the controllers.

With the foregoing in mind, FIG. 1 illustrates a block diagram of a system 10 that may implement arithmetic operations. A designer may desire to implement functionality, such as the operations of this disclosure, on an integrated circuit device 12 (e.g., a programmable logic device, such as a field programmable gate array (FPGA) or an application specific integrated circuit (ASIC)). In some cases, the designer may specify a high-level program to be implemented, such as an OPENCL® program, which may enable the designer to more efficiently and easily provide programming instructions to configure a set of programmable logic cells for the integrated circuit device 12 without specific knowledge of low-level hardware description languages (e.g., Verilog or VHDL). For example, since OPENCL® is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

The designer may implement high-level designs using design software 14, such as a version of INTEL® QUARTUS® by INTEL CORPORATION. The design software 14 may use a compiler 16 to convert the high-level program into a lower-level description. In some embodiments, the compiler 16 and the design software 14 may be packaged into a single software application. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of a logic block 26 on the integrated circuit device 12. The logic block 26 may include circuitry and/or other logic elements and may be configured to implement arithmetic operations, such as addition and multiplication.

The designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
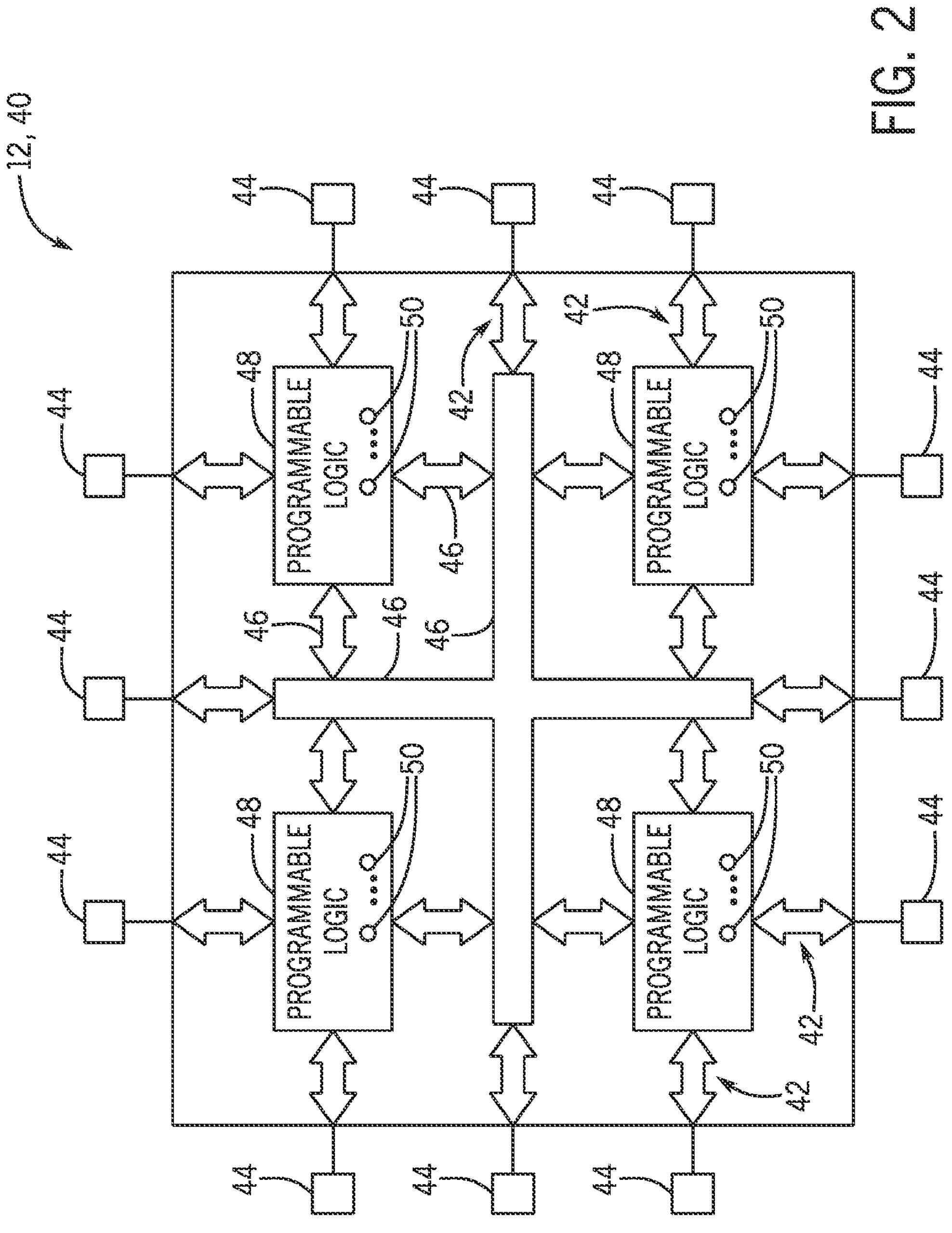
FIG. 2 is a block diagram of the integrated circuit device of FIG. 1, in accordance with an embodiment of the present disclosure.

Turning now to a more detailed discussion of the integrated circuit device 12, FIG. 2 is a block diagram of an example of the integrated circuit device 12 as a programmable logic device, such as a field-programmable gate array (FPGA). Further, it should be understood that the integrated circuit device 12 may be any other suitable type of programmable logic device (e.g., an ASIC and/or application-specific standard product). The integrated circuit device 12 may have input/output circuitry 42 for driving signals off device and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as the integrated circuit device 12, may include programmable elements 50 with the programmable logic 48. In some embodiments, at least some of the programmable elements 50 may be grouped into logic array blocks (LAB s). As discussed above, a designer (e.g., a customer) may (re)program (e.g., (re)configure) the programmable logic 48 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements 50. In general, programmable elements 50 may be based on any suitable programmable technology, such as fuses, antifuses, electrically programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using input/output pins 44 and input/output circuitry 42. In one embodiment, the memory cells may be implemented as random-access-memory (RAM) cells. The use of memory cells based on RAM technology as described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
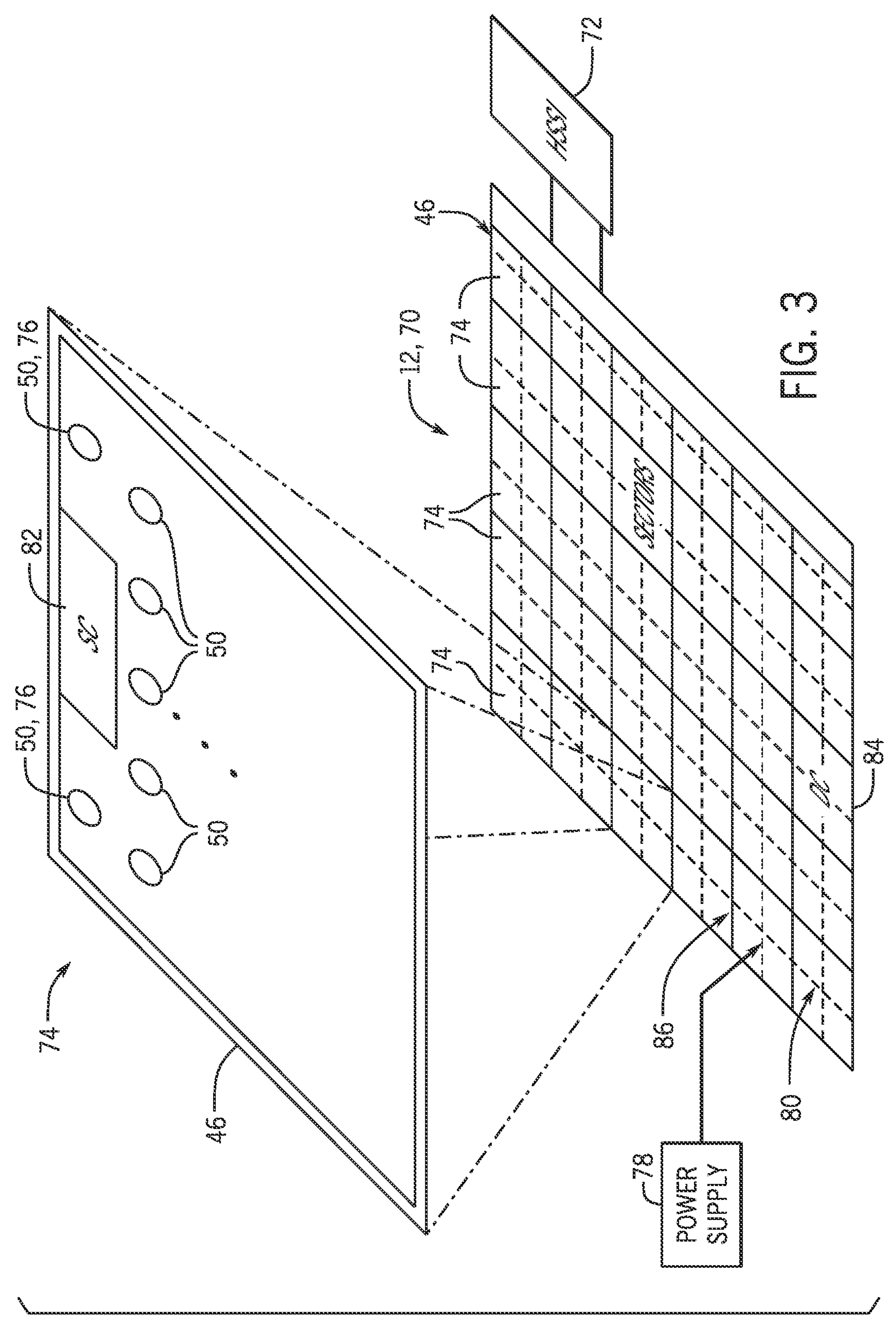
FIG. 3 is a diagram of programmable fabric of the integrated circuit device of FIG. 1, in accordance with an embodiment of the present disclosure.

The integrated circuit device 12 may include any programmable logic device such as a field programmable gate array (FPGA) 70, as shown in FIG. 3. For the purposes of this example, the FPGA 70 is referred to as an FPGA, though it should be understood that the device may be any suitable type of programmable logic device (e.g., an application-specific integrated circuit and/r application-specific standard product). In one example, the FPGA 70 is a sectorized FPGA of the type described in U.S. Patent Publication No. 2016/0049941, "Programmable Circuit Having Multiple Sectors," which is incorporated by reference in its entirety for all purposes. The FPGA 70 may be formed on a single plane. Additionally or alternatively, the FPGA 70 may be a three-dimensional FPGA having a base die and a fabric die of the type described in U.S. Pat. No. 10,833,679, "Multi-Purpose Interface for Configuration Data and User Fabric Data," which is incorporated by reference in its entirety for all purposes.

In the example of FIG. 3, the FPGA 70 may include transceiver 72 that may include and/or use input/output circuitry, such as input/output circuitry 42 in FIG. 2, for driving signals off the FPGA 70 and for receiving signals from other devices. Interconnection resources 46 may be used to route signals, such as clock or data signals, through the FPGA 70. The FPGA 70 is sectorized, meaning that programmable logic resources may be distributed through a number of discrete programmable logic sectors 74. Programmable logic sectors 74 may include a number of programmable logic elements 50 having operations defined by configuration memory 76 (e.g., CRAM). A power supply 78 may provide a source of voltage (e.g., supply voltage) and current to a power distribution network (PDN) 80 that distributes electrical power to the various components of the FPGA 70. Operating the circuitry of the FPGA 70 causes power to be drawn from the power distribution network 80.

There may be any suitable number of programmable logic sectors 74 on the FPGA 70. Indeed, while 29 programmable logic sectors 74 are shown here, it should be appreciated that more or fewer may appear in an actual implementation (e.g., in some cases, on the order of 50, 100, 500, 1000, 5000, 10,000, 50,000 or 100,000 sectors or more). Programmable logic sectors 74 may include a sector controller (SC) 82 that controls operation of the programmable logic sector 74. Sector controllers 82 may be in communication with a device controller (DC) 84.

Sector controllers 82 may accept commands and data from the device controller 84 and may read data from and write data into its configuration memory 76 based on control signals from the device controller 84. In addition to these operations, the sector controller 82 may be augmented with numerous additional capabilities. For example, such capabilities may include locally sequencing reads and writes to implement error detection and correction on the configuration memory 76 and sequencing test control signals to effect various test modes.

The sector controllers 82 and the device controller 84 may be implemented as state machines and/or processors. For example, operations of the sector controllers 82 or the device controller 84 may be implemented as a separate routine in a memory containing a control program. This control program memory may be fixed in a read-only memory (ROM) or stored in a writable memory, such as random-access memory (RAM). The ROM may have a size larger than would be used to store only one copy of each routine. This may allow routines to have multiple variants depending on "modes" the local controller may be placed into. When the control program memory is implemented as RAM, the RAM may be written with new routines to implement new operations and functionality into the programmable logic sectors 74. This may provide usable extensibility in an efficient and easily understood way. This may be useful because new commands could bring about large amounts of local activity within the sector at the expense of only a small amount of communication between the device controller 84 and the sector controllers 82.

Sector controllers 82 thus may communicate with the device controller 84, which may coordinate the operations of the sector controllers 82 and convey commands initiated from outside the FPGA 70. To support this communication, the interconnection resources 46 may act as a network between the device controller 84 and sector controllers 82. The interconnection resources 46 may support a wide variety of signals between the device controller 84 and sector controllers 82. In one example, these signals may be transmitted as communication packets.

The use of configuration memory 76 based on RAM technology as described herein is intended to be only one example. Moreover, configuration memory 76 may be distributed (e.g., as RAM cells) throughout the various programmable logic sectors 74 of the FPGA 70. The configuration memory 76 may provide a corresponding static control output signal that controls the state of an associated programmable logic element 50 or programmable component of the interconnection resources 46. The output signals of the configuration memory 76 may be applied to the gates of metal-oxide-semiconductor (MOS) transistors that control the states of the programmable logic elements 50 or programmable components of the interconnection resources 46.

As discussed above, some embodiments of the programmable logic fabric may be configured using indirect configuration techniques. For example, an external host device may communicate configuration data packets to configuration management hardware of the FPGA The data packets may be communicated internally using data paths and specific firmware, which are generally customized for communicating the configuration data packets and may be based on particular host device drivers (e.g., for compatibility). Customization may further be associated with specific device tape outs, often resulting in high costs for the specific tape outs and/or reduced salability of the FPGA 70.

Figure 4:
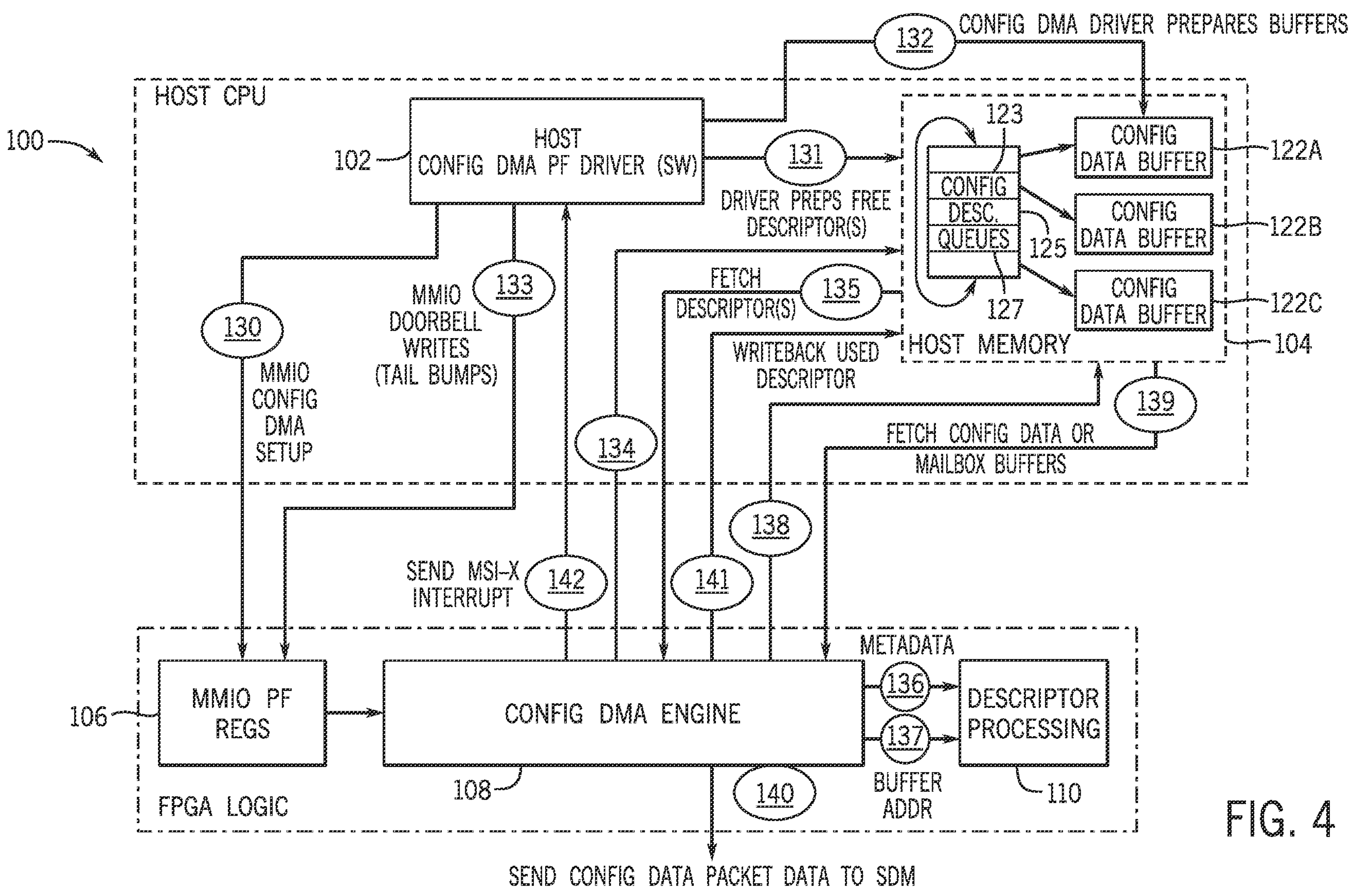
FIG. 4 is a diagram of a direct memory access configuration system, in accordance with an embodiment of the present disclosure.

With the foregoing in mind, FIG. 4 is a block diagram of a DMA configuration system 100. As shown, the DMA configuration system 100 generally includes a host configuration DMA physical function (PF) driver 102, a host memory 104, a MMIO PF register 106, a configuration DMA engine 108 (e.g., DMA circuitry), and a descriptor processor 110 (referred to herein as "components"). Generally, the host configuration DMA PF driver 102 may be a host CPU (e.g., server CPU) that may execute drivers for properly communicating with attached devices, such as software driver to manage an attached FPGA. The MMIO PF register 106, the configuration DMA engine 108, and the descriptor processor 110 may be part of FPGA logic (e.g., programmable logic), as indicated by the dashed-dot line box. On the other hand, the host configuration DMA physical function (PF) driver 102 and the host memory 104 may be part of, integrated with, or associated with a host CPU (e.g., external to the FPGA), as indicated by the dot line box. The host memory 104 may include the CRAM cells previously discussed. Although the techniques described herein are discussed with respect to a peripheral component interconnect express (PCIe) communication protocol, which represents a particular embodiment, the techniques described herein may apply to any protocol for communicating data packets of a configuration bitstream. Moreover, as shown, the host memory 104 includes configuration descriptors 125 in one or more descriptor queues 127 where the configuration descriptors 125 that are linked to one or more configuration data buffers 122 (e.g., a first configuration data buffer 122A, a second configuration data buffer 122B, a third configuration data buffer 122C, and so forth). In general, the configuration data 123, the descriptors 125, and the queues 127 refer to queues of configuration descriptors and corresponding configuration data buffers. Each row may include a configuration descriptor in the queue(s).

Generally, the components provide and/or receive data from one another, as indicated by the arrows pointing to and/or from the components in the system 100. In some embodiments, the data may flow in a particular order, as indicated by the numbers 130-142. As an overview, the system 100 may involve a hardware-based DMA engine to facilitate downloading an FPGA image by using multiple channels in a DMA architecture. By way of example, the system 100 may involve using a PCIe endpoint-based DMA pull model, allowing a host driver (e.g., software) to prepare descriptors in host memory buffers, which include pointers to one or more host resident data buffers storing FPGA configuration data, mailbox messages, or both. The PCIe host device driver may add new descriptors entries into one or more descriptor queues (e.g., circular ring buffers) by performing PCIe memory writes to tail pointer register(s) of the DMA controller. When the hardware-based DMA engine detects that a new descriptor is available, the DMA engine may start DMA-related operations. Additionally, a local control central processing unit (CPU) of the DMA engine may communicate with the host device driver via mailbox commands and response messages.

In particular, and as shown, the host configuration DMA PF driver 102 may provide (process block 130) a MMIO configuration DMA setup to the MMIO PF registers 106. The host configuration DMA PF driver 102 may also prepare and provide (process block 131) descriptors 123 that are unused (e.g., new, free, or unused descriptors), as well as prepare (process block 132) configuration data buffers 122, to send them to the host memory 104. Specifically, host configuration DMA PF driver 102 (e.g., software) may fetch configuration image data from storage. The host configuration DMA PF driver 102 may parse the data into block, partitions, or portions, and push the partitioned data it into local DRAM memory. The host configuration DMA PF driver 102 may also build the descriptor queues 127. The descriptor queues 127 may be headers that indicate location of each of the blocks of data, size of the blocks, the source addresses associated with the blocks, and the like. That is, the host configuration DMA PF driver 102 may set up these parameters in the host memory 104 using descriptor queues and set them up with pointers to the configuration data buffers 122 in host memory 104 as well. This is the preparation phase that a driver of the host configuration DMA PF driver 102 completes prior to starting the DMA operations.

When the preparation phase has completed or approximately completed (e.g., partial completion, above a predetermined threshold, and so forth), such that there are at least one or more blocks of configuration data available in the host memory 104, the host configuration DMA PF driver 102 may perform a memory map write into the configuration DMA engine 108.

The host configuration DMA PF driver 102 may also provide (process block 133) a memory-mapped I/O (MMIO) doorbell write (e.g., tail bump). In particular, the descriptor list may be a circular queue and the host configuration DMA PF driver 102 may perform a doorbell write to add or write in a pointer to the latest entry in the descriptor queue. That is, a doorbell write includes a tail bump and pointer. The writing process may involve a head pointer register and a tail pointer register, and when these registers are equal (e.g., same value), the queue may be empty (e.g., delivery configuration data work is completed).

Additionally, the DMA PF driver 102 may receive interrupts (e.g., message signaled interrupts (MSI), MSI-X, in-band signaling of an interrupt, and the like) from the configuration DMA engine 108. The DMA engine 108 may fetch descriptor(s) with a request (process block 134) of a link to configuration data 123 from descriptor(s) 125 in the configuration queues(s) 127. The configuration DMA engine 108 may receive (process block 135) the link from the descriptor(s) 125. Generally, when a tail pointer is updated, multiple memory addresses may be updated, such that the configuration DMA engine 108 may determine that delivery operations need to be completed. As such, the configuration DMA engine 108 may fetch descriptors 125 by performing a read operation for the descriptors 125 (e.g., not buffers 122), retrieve the data back to the configuration DMA engine 108 for processing, and determine the size of data at each of the addresses. The configuration DMA engine 108 may perform a data fetch operation to fetch actual configuration data buffers 122, which may generally be organized into blocks of data (e.g., 1000 bytes, 40000 bytes, and so forth). The configuration DMA engine 108 may perform a large size data read (e.g., complete read of the configuration data buffers 122) and/or perform a small-sized data read (e.g., sequential read of a relatively smaller sized blocks of data (e.g., more than 4 bytes, 14 bytes, 256 bytes, and so forth).

Using this information, the configuration DMA engine 108 may provide (process block 136) corresponding metadata 136 to a descriptor processor 110, which then processes the descriptor and provides (process block 137) a respective buffer address to the configuration DMA engine 104. The configuration DMA engine 104 may request (process block 138) and/or write the configuration and/or mailbox data to respective buffer address in the host memory 104. The configuration DMA engine 108 may receive (process block 139) configuration data buffers 122 and/or mailbox buffers as part of a fetch that included the process blocks 138 and 139. Using this data, the configuration DMA engine 108 may send (process block 140) data to a device configuration secure device manager (SDM) (e.g., device controller 84), which securely processes the configuration data for configuring the FPGA.

The configuration DMA engine 140 may also write back (process block 141) used descriptors 125. For instance, the write back may include status indicators such as success or failure of fetches using the descriptor. In other words, if there was an error in performing the fetch, an error code may be written back by the configuration DMA engine 108. Based on the number of used descriptors 125 with respect to available descriptors 125 and/or a maximum limit of descriptors 125, the configuration DMA engine 108 may send (process block 142) an interrupt to the host configuration DMA PF driver 102 to indicate the update or changes with respect to the descriptors 125.

Figure 5:
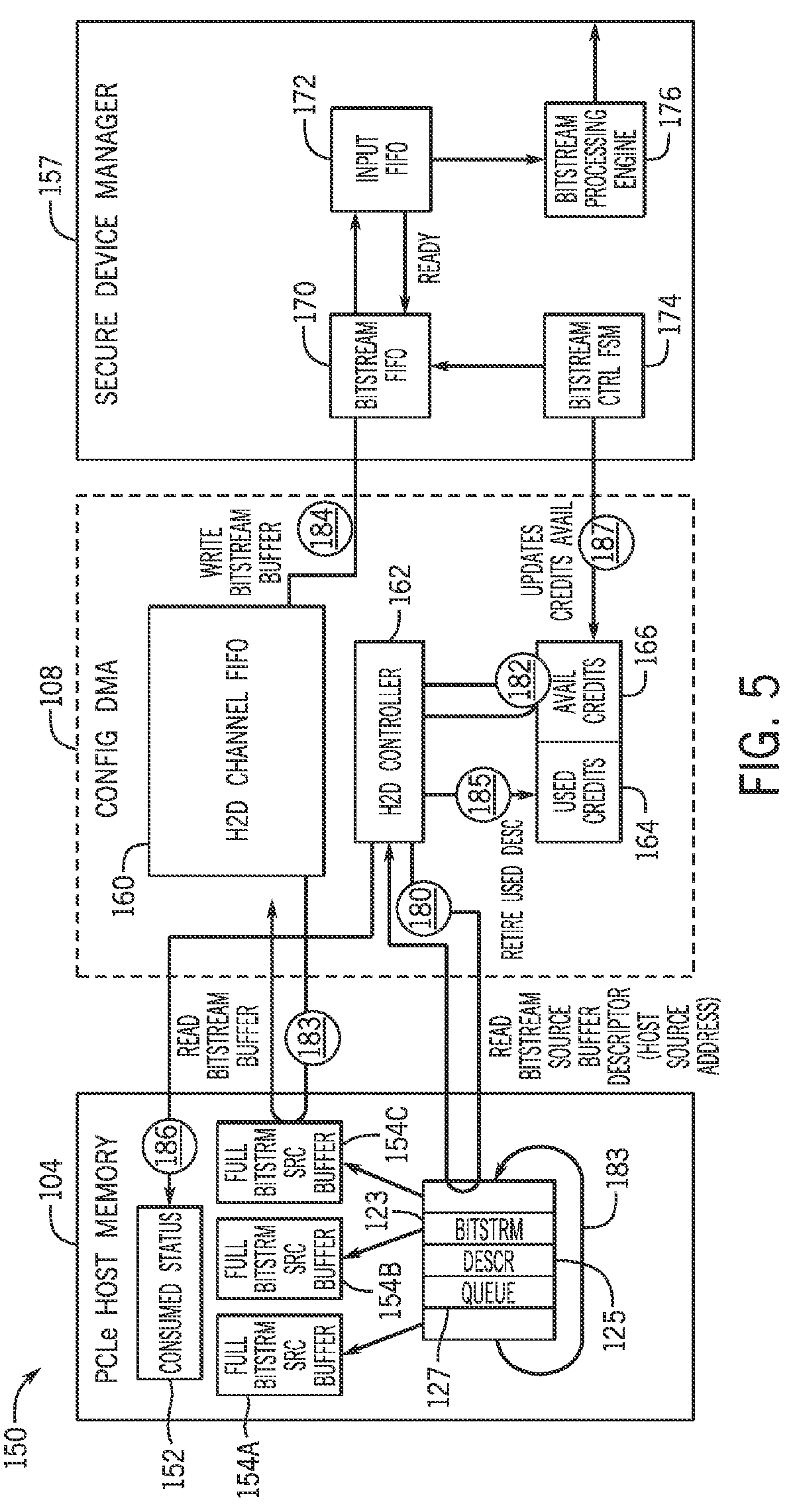
FIG. 5 is a flow diagram of delivering a configuration bitstream in the direct memory access configuration system, in accordance with an embodiment of the present disclosure.

FIG. 5 is a flow diagram of delivering a configuration bitstream in the DMA configuration system 100. Specifically, delivering the configuration bitstream may, in some embodiments, use multiple channels for efficient delivery of data in the DMA configuration system 100. In the depicted embodiment, the configuration bitstream is delivered over three DMA channels. A first DMA channel may include a command channel to generally deliver a configuration bitstream from the host memory 104 to the FPGA in a security device manager 157. A second DMA channel and a third DMA channel may send and receive mailbox communications from a host CPU with the host configuration DMA PF driver 102 to device agents, such as a local control and management CPU of the DMA configuration system 100 and/or the FPGA. The multiple DMA channels may facilitate bidirectional communication between the host CPU (e.g., via host configuration DMA PF driver 102) and the FPGA (e.g., via internal firmware software for communicating with the host CPU).

As shown, the host memory 104 includes a consumed status buffer 152 (e.g., and/or consumed register), one or more full bitstream source buffers 154 (e.g., a first full bitstream buffer 154A, a second full bitstream buffer 154B, a third full bitstream buffer 154C, and so forth), the configuration bitstream 123, the one or more descriptors 125, and one or more queues 127 (e.g., as described in FIG. 4). Moreover, the configuration DMA engine 108 includes a channel FIFO 160 (e.g., host-to-device channel FIFO), a DMA controller 162 (e.g., host-to-device DMA controller), a used credits buffer 164, and an available credit FIFO 166. In some embodiments, the used credits buffer 164 and the available credit FIFO 166 may be combined into a single register. The secure device manager 157 includes a bitstream FIFO 170, an input FIFO 172, a bitstream control finite state machine (FSM) 174, and a bitstream processing engine 176.

In some embodiments, data may flow in a particular order, as indicated by the numbers 180-187. Rather than using an internal, local control CPU firmware of the FPGA to send and/or receive configuration data in the system 100 for the configuration bitstream delivery, an indication of configuration data block credits in an internal first in, first out (FIFO) memory may be communicated over a DMA channel. Specifically, the DMA controller may read (process block 180) a bitstream source buffer descriptor 125. Generally, the descriptors 125 are related to configuration, commands, and responses. Different registers may be associated with these descriptors so that there are three different type of registers (e.g., respectively associated with configuration, commands, and/or responses).

Based on the descriptor information read, the DMA controller 162 may determine (process block 182) if sufficient credits are available in the available credits FIFO 182. If available credits exist in the available credit FIFO 166, a payload is written into the internal channel FIFO 170. If credits are unavailable or approximately unavailable (e.g., below a credits threshold), the DMA controller 162 may stop reading from the host memory 102 and may hold (process block 183) outstanding data packets in an internal buffer until (more) credits become available.

Moreover, FIFO bitstream control FSM 174 may read the bitstream FIFO 170, and the payload may be delivered to the input FIFO 172 of the secure device manager 157 for further processing. The channel FIFO 160 may write (process block 184) a bitstream buffer to the bitstream FIFO 170. As descriptors 125 are used, the DMA controller 162 may update (process block 185) the used credits FIFO 164 correspondingly, providing an indication of a retired descriptor 125. The DMA controller 162 may also read and/or write (process block 186) a consumed status 152 of bitstream buffers 154. Consumed status 152 of the bitstream buffers 152 may refer to used or presently unavailable buffers.

The FIFO bitstream control FSM 174 may monitor how much data was read from the bitstream FIFO 170. Moreover, each time a predefined credit worth of data (e.g. 4 KB) has been read, the FSM 174 may update (process block 187) credits available at the available credits FIFO 166, and write back to the configuration DMA channel FIFO 160. In this manner, the configuration DMA channel FIFO 160 may determine whether new credits are available for the bitstream FIFO 170, and as such, may proceed with delivering the next credit worth of data.

Figure 6:
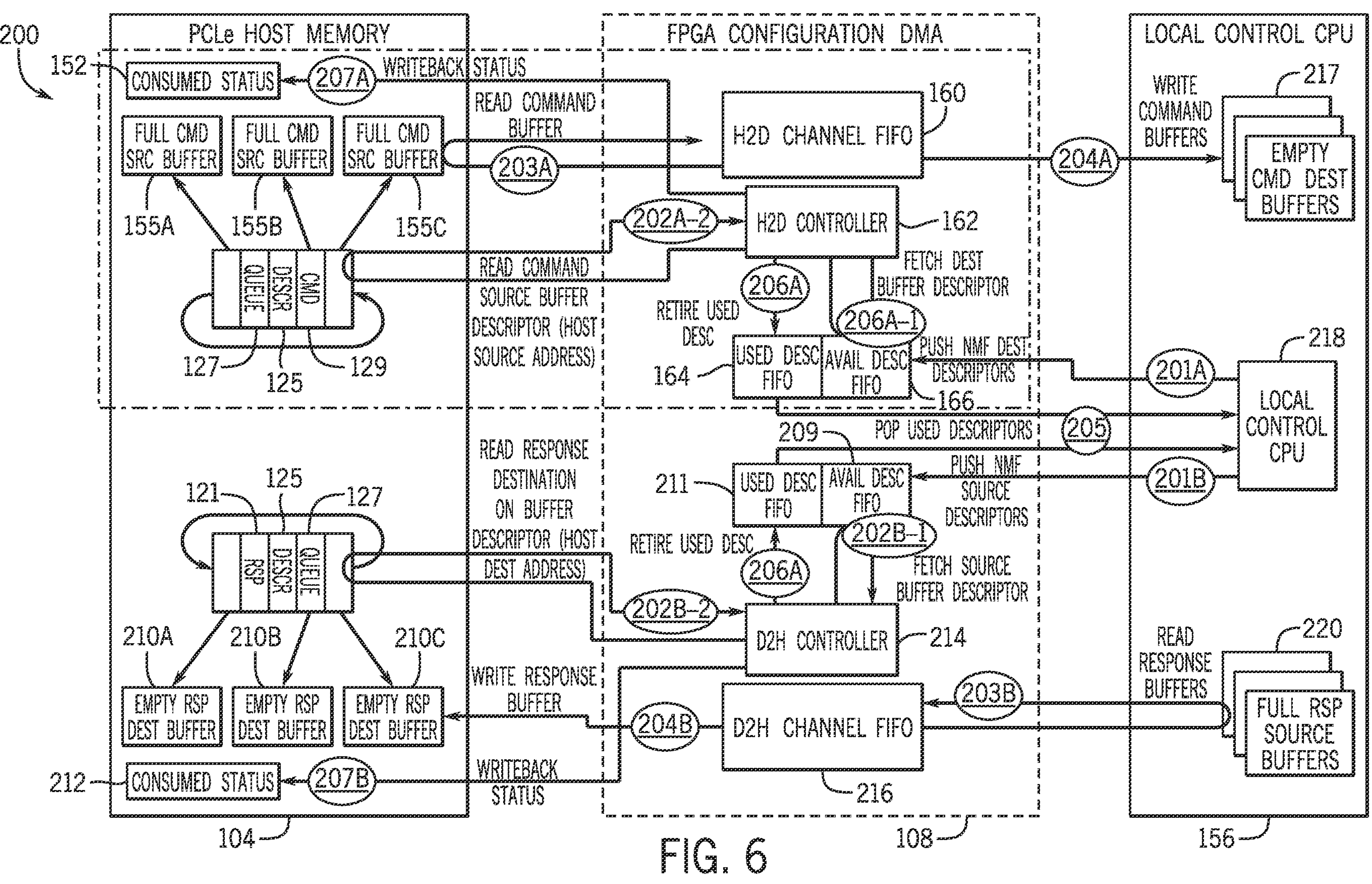
FIG. 6 is a flow diagram of communicating mailbox command messages over multiple-channels in the direct memory access configuration system, in accordance with an embodiment of the present disclosure.

FIG. 6 is a flow diagram of communicating mailbox command messages over the one or more DMA channels in the DMA configuration system 100. The communication may involve the host memory 104, the configuration DMA engine 108, and a local control CPU 156. Although data may flow in any order, in some embodiments, data may flow in a particular order, as indicated by the numbers 201-207. The local control CPU 156 of the FPGA may include one or more empty command destination buffers 217, a local control CPU controller 218, and one or more full response source buffers 220. Generally, the first DMA channel communicating commands within the system 100 is indicated by the dashed dot line box. In some embodiments, data may flow in a particular order, such as 201-207A, corresponding to 180-187 of FIG. 5. However, the channel FIFO 160 may write command buffers to the empty command destination buffers 217 of the local control CPU 156, and the local control CPU controller 218 may push destination descriptor data to the available description FIFO 166, which may operate as discussed with respect to FIG. 5.

Similarly, data in the depicted embodiment may flow in an order of 201-207B for a second DMA channel and/or a third DMA channel. The two DMA channels may facilitate in delivering mailbox command messages from a host to the device (H2D) and/or deliver mailbox response messages from the device to the host (D2H). Mailbox messages may include message queues for inter-process communication or inter-thread communication within the same process. The queue for messaging may include passing control of content.

Generally, channels facilitating mailbox communication may provide a bi-directional communication channel between software running in the host CPU (e.g., host configuration DMA PF driver 102) and local firmware running within a local control CPU (e.g., DMA controller 162) of the device. Additionally or alternatively, the communication channels may be used for various purposes, such as for coordinating bitstream traffic management, error information exchange, device telemetry data retrieval, and the like.

The local control CPU 218 may push (process block 201A) an indication of stored destination descriptors to the available descriptor FIFO 166 so that the available descriptor FIFO 166 may update a present queue of descriptors. For the host-to-device (H2D) mailbox channel operations, a host software may store and/or read one or more mailbox commands in local host memory buffers. When the host software device driver prepares to send a new command to the device, it places a descriptor 125 in host memory 104 that provides the address of the mailbox command buffer 155, along with length information, and may perform a MMIO write to the H2D DMA channel's tail pointer register. The H2D controller 162 checks whether there is an available descriptor in the available descriptor FIFO 166 (process block 202A-1) that indicates that there is one or more empty command destination buffers 217. If there is one or more empty command destination buffers 217, the DMA channel (e.g., local control CPU 218 and/or H2D controller 162) may determine that the descriptor queue 127 is not empty and as such, may perform a read to fetch (process block 202A-2) the new descriptor. Next, the FPGA configuration DMA 108 via the channel may extract the mailbox command address and length, and perform a host memory read (process block 203A) to fetch the new command message into its internal channel FIFO 160.

On the other side of the H2D DMA, the H2D controller may write (process block 204A) the command that has been read into the available one of the empty command destination buffers 217. When the DMA channel has a pending mailbox command stored internally, it may provide (process block 205) a notification for the next free buffer descriptor from the available buffers FIFO 166. The DMA channel (e.g., local control CPU 218 and/or H2D controller 162) may facilitate transmitting a host mailbox command message to the address for an internal free buffer in local memory space and may retire (process block 206A) the used descriptor into the used descriptor FIFO 164 along with the actual payload size of the mailbox command. The local control CPU 218 is then notified that a used descriptor 125 is available and may process the command message 129. The status is written back (process block 207A) to the host memory 104 (e.g., the consumed status buffer 152 to indicate the status as previously discussed.

In the case where the command message 129 requires a response message 121, the local control CPU 218 may store a response message in local memory, and then provides (process block 201B) a new available descriptor 125 in the device to host (D2H) available descriptor FIFO 209. Process blocks 202B-207B may be performed similarly to 202A-207A. For example, the host software may include pre-allocated one more empty response buffers 210 in the host memory 104 and may add the empty response buffers 210 into a D2H descriptor queue 127. Host software device driver may update the DMA D2H channel's tail pointer register to indicate that descriptors 125 are available and ready for use. The D2H DMA channel may facilitate in determining the free host descriptor 125 and performing a read to fetch the first descriptor 125 to determine the address and size of an empty host memory buffer 210. Next the D2H DMA controller 214 may read the internal response message buffer and store the data in the local D2H channel FIFO 216. Finally, the D2H channel controller 214 may write the response message 121 into the empty host memory buffer 210 and provide an interrupt notification to the host configuration DMA PF driver 102. The used descriptors 125 may be pushed into the D2H used descriptor FIFO 211, and the local control CPU 218 may be notified accordingly.

Figure 7:
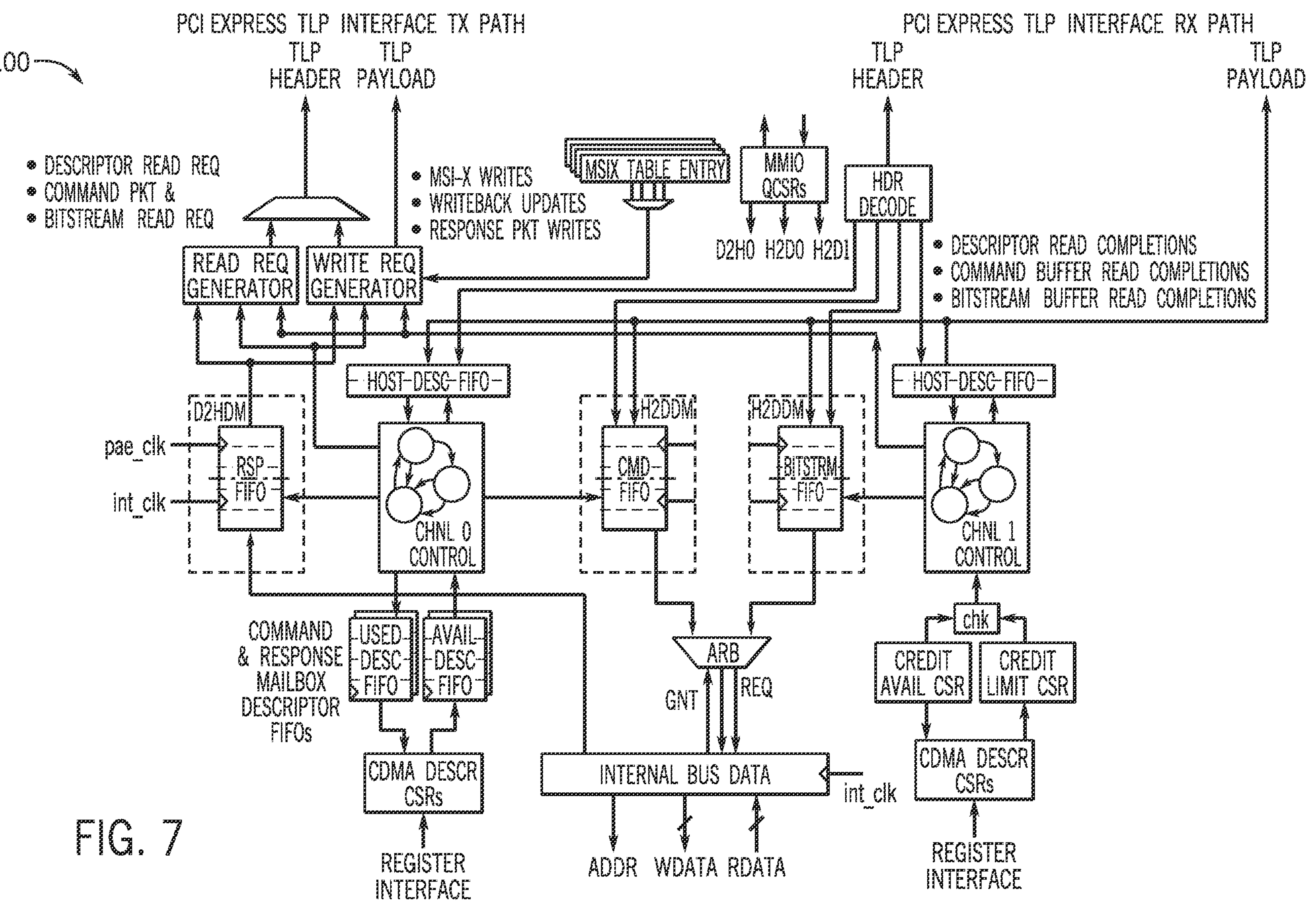
FIG. 7 is a block diagram of an example of multiple-channel architecture of the direct access memory configuration system, in accordance with an embodiment of the present disclosure.

FIG. 7 is a block diagram of an example multiple-channel architecture of the DMA configuration system 100. Generally, the example includes a PCIe implementation of the DMA configuration system 100 using the systems and methods described with respect to FIG. 4-6. This implementation uses two bi-directional (device-to-host (D2H) and host-to-device (H2D)) DMA controller engines 108 to manage three DMA channels. A DMA control channel may manage mailbox communication for host command messages (H2D messages) as well as device response messages (D2H messages). The second DMA control channel may facilitate FPGA bitstream image delivery from host to the device (H2D). A portion of the configuration DMA engine 108 may interface with a PCI Express endpoint controller (e.g., H2D controller 162) to issue appropriate memory reads and writes to host memory 104, as well as to expose a collection of MMIO control and status registers (CSRs), which may be accessible from base address registers (BAR) of the host software using a PCI Express endpoint function. Another portion of the DMA engine 108 may use a memory mapped interface (e.g., AXI interceding) to interface with the local control CPU 218, memory resources, as well as with the bitstream FIFO 170, and the like. The control CPU and bitstream FIFO control FSM 174 may read and/or write to DMA registers using a programming interface, such as AXI, APB, and the like.

Figure 8:
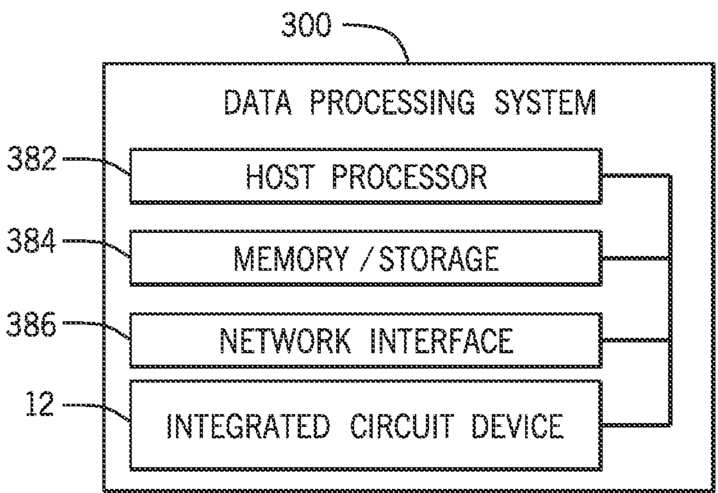
FIG. 8 is a block diagram of a data processing system, in accordance with an embodiment of the present disclosure, in accordance with an embodiment of the present disclosure.

Furthermore, the integrated circuit device 12 may generally be a data processing system or a component, such as an FPGA, included in a data processing system 300. For example, the integrated circuit device 12 may be a component of a data processing system 300 shown in FIG. 8. The data processing system 300 may include a host processor 382 (e.g., a central-processing unit (CPU)), memory and/or storage circuitry 384, and a network interface 386. The data processing system 300 may include more or fewer components (e.g., electronic display, user interface structures, application specific integrated circuits (ASICs)). The host processor 382 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 300 (e.g., to perform debugging, data analysis, encryption, decryption, machine learning, video processing, voice recognition, image recognition, data compression, database search ranking, bioinformatics, network security pattern identification, spatial navigation, or the like). The memory and/or storage circuitry 384 may include random access memory (RAM), read-only memory (ROM), one or more hard drives, flash memory, or the like. The memory and/or storage circuitry 384 may hold data to be processed by the data processing system 300. In some cases, the memory and/or storage circuitry 384 may also store configuration programs (bitstreams) for programming the integrated circuit device 12. The network interface 386 may allow the data processing system 300 to communicate with other electronic devices. The data processing system 300 may include several different packages or may be contained within a single package on a single package substrate.

In one example, the data processing system 300 may be part of a data center that processes a variety of different requests. For instance, the data processing system 300 may receive a data processing request via the network interface 386 to perform acceleration, debugging, error detection, data analysis, encryption, decryption, machine learning, video processing, voice recognition, image recognition, data compression, database search ranking, bioinformatics, network security pattern identification, spatial navigation, digital signal processing, or some other specialized tasks.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. A system, comprising:

a host device comprising a host memory, the host memory storing configuration data; and an integrated circuit device comprising:

an integrated circuit; and a direct memory access circuitry to:

pull the configuration data from the host memory; and program the integrated circuit based on the configuration data.

EXAMPLE EMBODIMENT 2. The system of example embodiment 1, wherein the host device is to execute a host device driver software to prepare one or more descriptors in one or more host memory buffers of the host memory, and the host device comprises one or more host memory buffers comprising pointers to one or more host memory resident data buffers storing the configuration data, mailbox messages, or both.

EXAMPLE EMBODIMENT 3. The system of example embodiment 2, wherein a local control central processing unit of the integrated circuit device is configurable to communicate with the host device driver software using the mailbox messages.

EXAMPLE EMBODIMENT 4. The system of example embodiment 1, wherein a host device driver of the host device is configured to add new descriptor entries into one or more descriptor queues by performing memory writes to a tail pointer register associated with the direct access memory engine.

EXAMPLE EMBODIMENT 5. The system of example embodiment 4, wherein in response to the new descriptor entries added, the direct memory access engine is configurable to perform direct memory access-related operations.

EXAMPLE EMBODIMENT 6. The system of example embodiment 1, wherein the direct memory access circuitry comprises a plurality of direct memory access channels.

EXAMPLE EMBODIMENT 7. The system of example embodiment 6, wherein a first channel of the plurality of direct memory access channels is to communicate the configuration data from the host device to the direct memory access engine.

EXAMPLE EMBODIMENT 8. The system of example embodiment 6, wherein a second channel and a third channel of the plurality of direct memory access channels are to communicate mailbox messages from the host device to the integrated circuit device.

EXAMPLE EMBODIMENT 9. The system of example embodiment 6, wherein a second channel of the plurality of direct memory access channels is to provide bidirectional communication of mailbox messages between the host device and the integrated circuit device.

EXAMPLE EMBODIMENT 10. The system of example embodiment 1, wherein the integrated circuit is a field programmable gate array.

EXAMPLE EMBODIMENT 11. A method, comprising:

determining, using a processor, that one or more buffers in a host memory of a host device store configuration data to configure a field programmable gate array of a field programmable gate array device;

pulling the configuration data from the one or more buffers via a direct memory access engine of the field programmable gate array; and transmitting the configuration data from the host memory to programmable logic of the field programmable gate array.

EXAMPLE EMBODIMENT 12. The method of example embodiment 11, wherein pulling the configuration data is based at least in part on a first in first out (FIFO) associated with the host device, field programmable gate array device, or both.

EXAMPLE EMBODIMENT 13. The method of example embodiment 11, wherein the direct memory access engine comprises a plurality of channels.

EXAMPLE EMBODIMENT 14. The method of example embodiment 13, wherein a first channel of the plurality of channels is to communicate the configuration data.

15. The method of example embodiment 13, wherein a second channel and a third channel of the plurality of channels are to communicate mailbox messages, responses, or both.

EXAMPLE EMBODIMENT 16. A tangible, non-transitory, machine-readable medium, comprising machine-readable instructions that, when executed by one or more processors, cause the one or more processors to determine, using a processor, that one or more buffers in a host memory of a host device comprise configuration data to configure a field programmable gate array of a field programmable gate array device;

pull the configuration data from the one or more buffers via a direct memory access engine of the field programmable gate array;

partition the configuration data into one or more blocks of data; and transmit the one or more blocks of configuration data to programmable logic of the field programmable gate array.

EXAMPLE EMBODIMENT 17. The tangible, non-transitory, machine-readable medium of example embodiment 16, wherein the one or more blocks of configuration data comprise at least 6 bytes of configuration data.

EXAMPLE EMBODIMENT 18. The tangible, non-transitory, machine-readable medium of example embodiment 16, wherein pulling the configuration data is based at least in part on first in first out (FIFO) associated with the host device, field programmable gate array device, or both.

EXAMPLE EMBODIMENT 19. The tangible, non-transitory, machine-readable medium of example embodiment 16, wherein the direct memory access engine comprises a plurality of channels.

EXAMPLE EMBODIMENT 20. The tangible, non-transitory, machine-readable medium of example embodiment 19, wherein a first channel of the plurality of channels is configured to communicate the configuration data.

What is claimed is:

1. A system, comprising:

a host device comprising a host memory, the host memory storing configuration data; and an programmable logic device comprising:

a state machine configured to control flow of the configuration data to the programmable logic device and to update an available credits buffer indicating how much data the programmable logic device is capable of servicing; and a direct memory access circuitry including the available credits buffer to:

determine whether credits are available in the available credits buffer;

pull the configuration data from the host memory when credits are available in the available credits buffer;

update the available credits buffer based on a write back from the state machine; and program the integrated circuit based on the configuration data.

2. The system of claim 1, wherein the host device is to execute a host device driver software to prepare one or more descriptors in one or more host memory buffers of the host memory, and the host device comprises one or more host memory buffers comprising pointers to one or more host memory resident data buffers storing the configuration data, mailbox messages, or both.

3. The system of claim 2, wherein a local control central processing unit of the integrated circuit device is configurable to communicate with the host device driver software using the mailbox messages.

4. The system of claim 1, wherein a host device driver of the host device is configured to add new descriptor entries into one or more descriptor queues by performing memory writes to a tail pointer register associated with the direct access memory engine.

5. The system of claim 4, wherein in response to the new descriptor entries added, the direct memory access engine is configurable to perform direct memory access-related operations.

6. The system of claim 1, wherein the direct memory access circuitry comprises a plurality of direct memory access channels.

7. The system of claim 6, wherein a first channel of the plurality of direct memory access channels is to communicate the configuration data from the host device to the direct memory access engine.

8. The system of claim 6, wherein a second channel and a third channel of the plurality of direct memory access channels are to communicate mailbox messages from the host device to the integrated circuit device.

9. The system of claim 6, wherein a second channel of the plurality of direct memory access channels is to provide bidirectional communication of mailbox messages between the host device and the integrated circuit device.

10. The system of claim 1, wherein the integrated circuit is a field programmable gate array.

11. The system of claim 1, wherein the integrated circuit device is configured to control exchange of the configuration data via the direct memory access circuitry without involvement from a processor of the host device.

12. A method, comprising:

determining, using a processor, that one or more buffers in a host memory of a host device store configuration data to configure a field programmable gate array of a field programmable gate array device;

determining, by direct memory access engine of the field programmable gate array device, whether credits are available in an available credits buffer of direct memory access engine, wherein the available credits indicate how much data the programmable logic device is capable of servicing;

in response to determining that there are available credits in the available credits buffer, pulling the configuration data from the one or more buffers via the direct memory access engine of the field programmable gate array;

transmitting the configuration data from the host memory to programmable logic of the field programmable gate array; and based at least part on the transmission of the configuration data from the host memory to the programmable logic, writing back by a state machine of the field programmable gate array an indication of the available credits changing by an amount of configuration data transmitted from the host memory to the programmable logic.

13. The method of claim 12, wherein pulling the configuration data is based at least in part on a first in first out (FIFO) associated with the host device, field programmable gate array device, or both.

14. The method of claim 12, wherein the direct memory access engine comprises a plurality of channels.

15. The method of claim 14, wherein a first channel of the plurality of channels is to communicate the configuration data.

16. The method of claim 14, wherein a second channel and a third channel of the plurality of channels are to communicate mailbox messages, responses, or both.

17. A tangible, non-transitory, machine-readable medium, comprising machine-readable instructions that, when executed by one or more processors, cause the one or more processors to determine, using a processor, that one or more buffers in a host memory of a host device comprise configuration data to configure a field programmable gate array of a field programmable gate array device;

pull the configuration data from the one or more buffers via a direct memory access engine of the field programmable gate array;

partition the configuration data into one or more blocks of data each corresponding to a credit of configuration data to be transferred, wherein an available credits buffer of the direct memory access engine is updated by a state machine of the field programmable gate array device each time a block of the one or more blocks of data is transmitted from the processor to the field programmable gate array device to indicate a change in available resources of the field programmable gate array; and based at least in part on available credits indicated in the available credits buffer, transmit at least one of the one or more blocks of configuration data to programmable logic of the field programmable gate array.

18. The tangible, non-transitory, machine-readable medium of claim 17, wherein the one or more blocks of configuration data comprise at least 6 bytes of configuration data.

19. The tangible, non-transitory, machine-readable medium of claim 17, wherein pulling the configuration data is based at least in part on first in first out (FIFO) associated with the host device, field programmable gate array device, or both.

20. The tangible, non-transitory, machine-readable medium of claim 17, wherein the direct memory access engine comprises a plurality of channels.

21. The tangible, non-transitory, machine-readable medium of claim 20, wherein a first channel of the plurality of channels is configured to communicate the configuration data.

* * * * *